(12) United States Patent
Liu

(10) Patent No.: US 9,901,115 B2
(45) Date of Patent: Feb. 27, 2018

(54) BATTERY COMPONENT AND ELECTRONIC CIGARETTE

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 14/915,275

(22) PCT Filed: Aug. 30, 2013

(86) PCT No.: PCT/CN2013/082698
§ 371 (c)(1),
(2) Date: Feb. 29, 2016

(87) PCT Pub. No.: WO2015/027473
PCT Pub. Date: Mar. 5, 2015

(65) Prior Publication Data
US 2016/0213061 A1    Jul. 28, 2016

(51) Int. Cl.
*A24F 27/00* (2006.01)
*A24F 47/00* (2006.01)
*H01M 2/10* (2006.01)

(52) U.S. Cl.
CPC .......... *A24F 47/004* (2013.01); *A24F 47/002* (2013.01); *A24F 47/008* (2013.01);
(Continued)

(58) Field of Classification Search
CPC ............................ H01M 2/105; A24F 47/004
See application file for complete search history.

(56) References Cited

U.S. PATENT DOCUMENTS 1,332,482 A * 3/1920 Baker ................. H01M 2/105
429/121
4,083,011 A * 4/1978 Ferrell ................ H01M 2/1055
439/500
(Continued)

FOREIGN PATENT DOCUMENTS

CN    101931063 A    12/2010
CN    202566290 U    12/2012

OTHER PUBLICATIONS

International Search Report of PCT Patent Application No. PCT/CN2013/082698 dated Jun. 10, 2014.

*Primary Examiner* — James Harvey

(57) ABSTRACT

A battery component comprises a casing pipe used for accommodating a battery and an end cover that is arranged on and covers an open end of the casing pipe, and also comprises a rotation mechanism used for connecting the casing pipe to the end cover. The end cover rotates around the center axis of the rotation mechanism to open or close the casing pipe. Using the rotation mechanism, the end cover can be directly rotated to open the casing pipe. When a connection structure on one side of the end cover facing the rotation mechanism fails, the end cover is not naturally opened, overcoming a defect that reserved space exists in an axial direction of the electronic cigarette when a fastening structure in an end cover flipping technology fails, making the end cover partially open, and thus power leakage hidden danger exists.

18 Claims, 7 Drawing Sheets

(52) U.S. Cl.
CPC ......... *H01M 2/105* (2013.01); *H01M 2/1005* (2013.01); *H01M 2/1055* (2013.01); *H01M 2220/30* (2013.01)

(56) References Cited

U.S. PATENT DOCUMENTS

| | | | | |
|---|---|---|---|---|
| 2002/0047237 | A1* | 4/2002 | Oshita | A63F 13/08 |
| | | | | 273/148 R |
| 2010/0124695 | A1* | 5/2010 | Chen | H01M 2/1066 |
| | | | | 429/96 |
| 2010/0321868 | A1* | 12/2010 | Yang | H01M 2/1066 |
| | | | | 361/679.01 |
| 2011/0008663 | A1* | 1/2011 | Liu | H01M 2/1016 |
| | | | | 429/96 |
| 2011/0064982 | A1* | 3/2011 | Liu | H01M 2/1044 |
| | | | | 429/100 |
| 2011/0091757 | A1* | 4/2011 | Wang | H01M 2/1022 |
| | | | | 429/97 |
| 2013/0081642 | A1* | 4/2013 | Safari | A24F 47/008 |
| | | | | 131/329 |
| 2013/0164591 | A1* | 6/2013 | Su | G06F 1/1658 |
| | | | | 429/100 |
| 2013/0213418 | A1* | 8/2013 | Tucker | A24F 47/008 |
| | | | | 131/328 |
| 2014/0182609 | A1* | 7/2014 | Liu | A24F 47/008 |
| | | | | 131/329 |
| 2016/0213061 | A1* | 7/2016 | Liu | A24F 47/008 |

* cited by examiner

BATTERY COMPONENT AND ELECTRONIC CIGARETTE

TECHNICAL FIELD

The present application relates to the field of household electronic products, and more particularly relates to a battery component and an electronic cigarette.

BACKGROUND OF THE APPLICATION

An electronic cigarette comprises an atomizing unit and a battery component, and the battery component comprises a battery. The battery is used for powering the atomizing unit and an outer casing pipe is sheathed outside of the battery. In the prior art, a threaded connection structure is often used to connect an end cover of the outer casing pipe of the battery to the outer casing pipe, and the end cover needs to be rotated when using the electronic cigarette, which makes it complicated to change a battery.

An application in which the outer casing pipe is opened by flipping the end cover has been submitted but not published. But a fastening structure may become loose when the end cover is opened too much times as the end cover is flipped along an axial direction of the outer casing pipe. For the battery arranged in the outer casing pipe of the electronic cigarette, an reserved space exists in an axial direction of the electronic cigarette, making the end cover naturally and partially open, and thus power leakage hidden danger exists.

SUMMARY OF THE APPLICATION

The objective of the present application is to provide a battery component and an electronic cigarette, aiming at above-mentioned drawbacks: the complicated operation when changing the battery of an electronic cigarette in which a threaded connection structure is used to connect the end cover to the outer casing pipe; and the power leakage hidden danger caused by a loose fastening structure of the partially opened end cover when the end cover is opened too much times by using an end cover flipping technology.

The technical solutions of the present application for solving the technical problems are as follows:

a battery component is provided which comprises a casing pipe used for accommodating a battery and an end cover that is arranged on and covers an open end of the casing pipe; the battery component further comprises a rotation mechanism used for connecting the casing pipe to the end cover; a center axis of the rotation mechanism is parallel to a central axis line of the casing pipe; and the end cover rotates about the center axis of the rotation mechanism so as to open or close the casing pipe.

In the battery component of the present application, the rotation mechanism comprises a first connection portion and a second connection portion, and the first connection portion is connected to the second connection portion via a rotation shaft or a pin shaft.

In the battery component of the present application, the first connection portion is connected to the second connection portion via the rotation shaft; the first connection portion is a first flange; wherein the first flange is defined on a side edge of the open end of the casing pipe and further radially extends along a direction away from a central axis of the casing pipe; the second connection portion is a second flange; the second flange is defined on a side edge of the end cover and further extends along the same direction with the first flange; a first through hole is defined on the first flange; a second through hole is defined on the second flange; the rotation shaft successively passes through space respectively formed by the first through hole and the second through hole; limiting covers arranged are on both ends of the rotation shaft, and used for limiting an axial displacement of the end cover.

In the battery component of the present application, a magnetic connection structure is arranged on an end face of the casing pipe and the end face is contacted with the end cover.

In the battery component of the present application, an elastic snap-fit connection structure is arranged on another side opposite to the rotation mechanism, and the elastic snap-fit connection structure is used to form an elastic snap-fit connection between the end cover and the casing pipe.

In the battery component of the present application, the elastic snap-fit connection structure comprises at least one overhead part and at least one accommodating part matching with the overhead part; wherein the overhead part is defined on a peripheral wall surface of the casing pipe or the end cover; the accommodating part is defined on the peripheral wall surface of end cover or the casing pipe; and the overhead part is elastically arranged on the top inside the accommodating part.

In the battery component of the present application, the overhead part is a bulge; the bulge axially extends along a direction away from the open end of the casing pipe in such a way that a gradient thereof gradually decreases; the accommodating part is a groove.

In the battery component of the present application, the overhead part is an elastic piece, and two ends of the elastic piece are movably mounted inside a tapered groove defined between an inner wall and an outer wall of the casing pipe.

In the battery component of the present application, a first mounting hole is defined between an inner wall and an outer wall of the casing pipe, and is further defined axially along the open end of the casing pipe; the overhead part is a telescopic rod movably connected to an inside of the first mounting hole; an elastic member is fixed between the telescopic rod and a bottom of the first mounting hole; the accommodating part is a second mounting hole defined on the end cover and right opposite the first mounting hole; when the end cover and the casing pipe are closed, the telescopic rod is inserted into the second mounting hole under an elastic force of the elastic member; while during the opening process of the end cover and the casing pipe, the telescopic rod is pressed into the first mounting hole.

In the battery component of the present application, a circular groove is defined in the middle of an end of the end cover and the end faces the casing pipe; a radius of the circular groove is equal to an inner diameter of the casing pipe; a circular truncated cone used for abutting against the battery is defined on a bottom of the circular groove and axially extends along a direction towards the casing pipe.

In the battery component of the present application, a contact piece used for abutting against the battery is arranged on an area where the circular truncated cone is contacted with the battery.

An electronic cigarette is also provided, which comprises an atomizing unit and a battery component, wherein the battery component comprises a casing pipe used for accommodating a battery and an end cover that is arranged on and covers an open end of the casing pipe; the battery component further comprises a rotation mechanism used for connecting the casing pipe to the end cover; a center axis of the rotation mechanism is parallel to a central axis line of the casing pipe; and the end cover rotates about the center axis of the rotation mechanism so as to open or close the casing pipe.

In the electronic cigarette of the present application, the rotation mechanism comprises a first connection portion and a second connection portion, and the first connection portion is connected to the second connection portion via a rotation shaft or a pin shaft.

In the electronic cigarette of the present application, the first connection portion is connected to the second connection portion via the rotation shaft; the first connection portion is a first flange; wherein the first flange is defined on a side edge of the open end of the casing pipe and further radially extends along a direction away from a central axis of the casing pipe; the second connection portion is a second flange; the second flange is defined on a side edge of the end cover and further extends along the same direction with the first flange; a first through hole is defined on the first flange; a second through hole is defined on the second flange; the rotation shaft successively passes through space respectively formed by the first through hole and the second through hole; limiting covers are arranged on both ends of the rotation shaft, and are used for limiting an axial displacement of the end cover.

In the electronic cigarette of the present application, a magnetic connection structure is arranged on an end face of the casing pipe and the end face is contacted with the end cover.

In the electronic cigarette of the present application, an elastic snap-fit connection structure is arranged on another side opposite to the rotation mechanism, and the elastic snap-fit connection structure is used to form an elastic snap-fit connection between the end cover and the casing pipe.

In the electronic cigarette of the present application, the elastic snap-fit connection structure comprises at least one overhead part and at least one accommodating part matching with the overhead part; wherein the overhead part is defined on a peripheral wall surface of the casing pipe or the end cover; the accommodating part is defined on the peripheral wall surface of end cover or the casing pipe; and the overhead part is elastically arranged on the top inside the accommodating part.

In the electronic cigarette of the present application, the overhead part is a bulge; the bulge axially extends along a direction away from the open end of the casing pipe in such a way that a gradient thereof gradually decreases; the accommodating part is a groove.

In the electronic cigarette of the present application, a first mounting hole is defined between an inner wall and an outer wall of the casing pipe, and is further defined axially along the open end of the casing pipe; the overhead part is a telescopic rod movably connected to an inside of the first mounting hole; an elastic member is fixed between the telescopic rod and a bottom of the first mounting hole; the accommodating part is a second mounting hole defined on the end cover and right opposite the first mounting hole; when the end cover and the casing pipe are closed, the telescopic rod is inserted into the second mounting hole under an elastic force of the elastic member; while during the opening process of the end cover and the casing pipe, the telescopic rod is pressed into the first mounting hole.

In the electronic cigarette of the present application, the atomizing unit and the battery component are an integrally formed structure or a detachably connected structure.

In summary, when implementing the electronic cigarette of the present application, the following advantageous effects can be achieved: by using the rotation mechanism which connects the battery component to the electronic cigarette, the end cover can be directly rotated to open the casing pipe; an operation is simple; in addition, the center axis of the rotation mechanism is parallel to the central axis line of the casing pipe, and the end cover rotates about the center axis of the rotation mechanism so as to open or close the casing pipe; in this way, even when a connection structure on one side of the end cover facing the rotation mechanism fails, the end cover is not naturally opened because the radial space is very compact, overcoming a defect that reserved space exists in an axial direction of the electronic cigarette, which makes the end cover partially open and results in an existent of power leakage hidden danger exists, when a fastening structure in an end cover flipping technology fails.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments. A battery component and an electronic cigarette are provided here, aiming at following drawbacks: the complicated operation when changing the battery of an electronic cigarette in which a threaded connection structure is used to connect the end cover to the outer casing pipe; and the power leakage hidden danger caused by a loose fastening structure of the partially opened end cover when the end cover is opened too much times by using an end cover flipping technology.

The battery component of the present application comprises a casing pipe used for accommodating a battery and an end cover that is arranged on and covers an open end of the casing pipe. The battery component further comprises a rotation mechanism used for connecting the casing pipe to the end cover. A center axis of the rotation mechanism is parallel to a central axis line of the casing pipe; and the end cover rotates about the center axis of the rotation mechanism so as to open or close the casing pipe.

Using the rotation mechanism which connects the casing pipe to the end cover, the end cover can be directly rotated to open the casing pipe, and the operation is simple. In addition, the center axis of the rotation mechanism is parallel to the central axis line of the casing pipe, and the end cover rotates about the center axis of the rotation mechanism so as to open or close the casing pipe; in this way, even when a connection structure on one side of the end cover facing the rotation mechanism fails, the end cover is not naturally opened because the radial space is very compact, overcoming a defect that reserved space exists in an axial direction of the electronic cigarette, which makes the end cover partially open and results in an existent of power leakage hidden danger exists, when a fastening structure in an end cover flipping technology fails.

Figure 1:
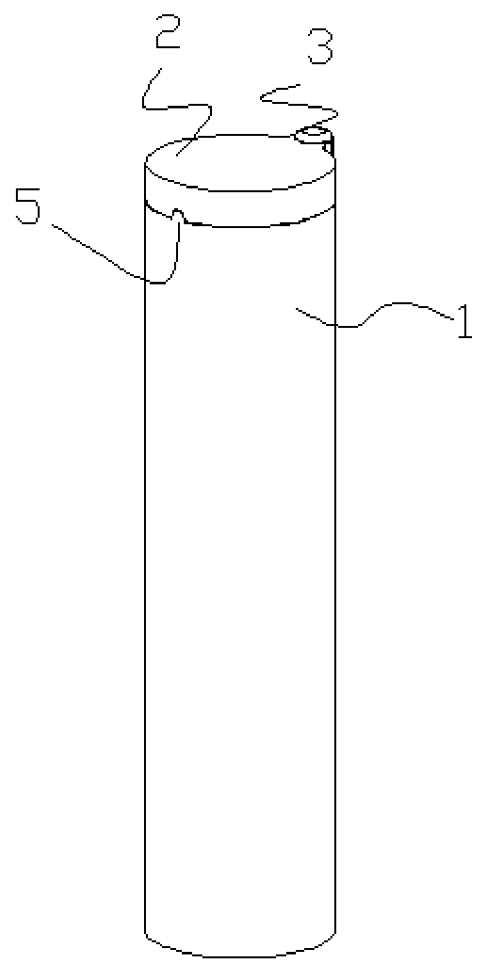
FIG. 1 is a structural schematic view of a closed battery component, according to a first embodiment of the present application.
Figure 2:
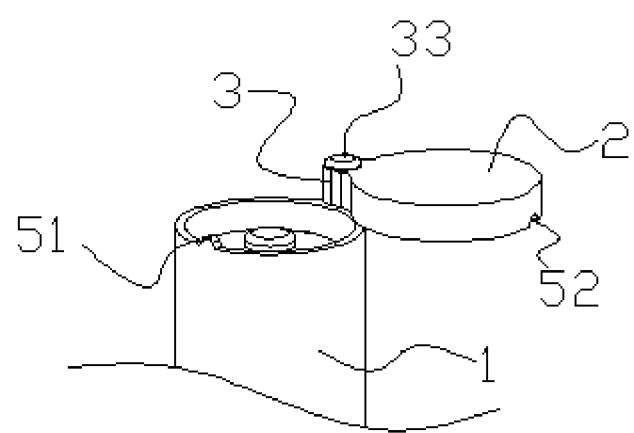
FIG. 2 is a structural schematic view of an opened battery component, according to the first embodiment of the present application.
Figure 3:
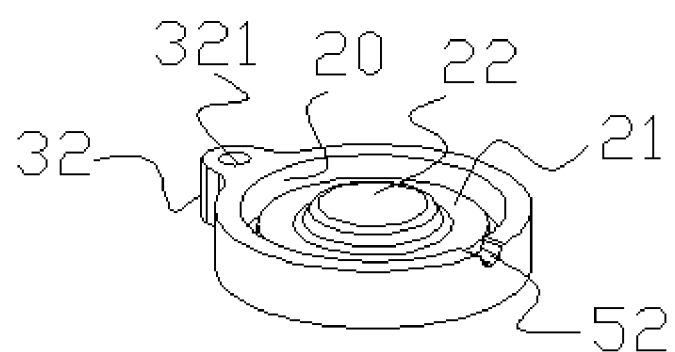
FIG. 3 is a perspective view of the end cover in FIG. 2.

Several embodiments are detailed described as below:

Embodiment 1:

Referring to FIG. 1-3, FIG. 1 is a structural schematic view of a closed battery component, according to a first embodiment of the present application; FIG. 2 is a structural schematic view of an opened battery component, according to a first embodiment of the present application; and FIG. 3 is a perspective view of the end cover in FIG. 2.

In the first embodiment, the battery component comprises a casing pipe 1 used for accommodating a battery and an end cover 2 that is arranged on and covers an open end of the casing pipe 1; wherein, the battery component further comprises a rotation mechanism 3 used for connecting the casing pipe 1 to the end cover 2. A center axis of the rotation mechanism 3 is parallel to a central axis line of the casing pipe 1; and the end cover 2 rotates about the center axis of the rotation mechanism 3 so as to open or close the casing pipe 1.

Wherein, the rotation mechanism 3 comprises a first connection portion and a second connection portion, and the first connection portion is connected to the second connection portion via a rotation shaft or a pin shaft. In this embodiment, the first connection portion is preferably connected to the second connection portion via the rotation shaft. The first connection portion is a first flange; wherein the first flange is defined on a side edge of the open end of the casing pipe 1 and further extends radially along a direction away from a central axis of the casing pipe 1. The second connection portion is a second flange 32, wherein the second flange 32 is defined on a side edge of the end cover 2 and further extends along the same direction with the first flange.

A first through hole is defined on the first flange, and a second through hole 321 right opposite the first through hole is defined on the second flange 32. The rotation shaft successively passes through respectively formed by the first through hole and the second through hole 321. Limiting covers 33 are arranged on both ends of the rotation shaft, and are used for limiting an axial displacement of the end cover 2.

An elastic snap-fit connection structure 5 is arranged on another side opposite to the rotation mechanism 3, and the elastic snap-fit connection structure 5 is used to form an elastic snap-fit connection between the end cover 2 and the casing pipe 1.

The elastic snap-fit connection structure 5 comprises at least one overhead part and at least one accommodating part matching with the overhead part; wherein the overhead part is defined on a peripheral wall surface of the casing pipe 1 or the end cover 2, and the accommodating part is defined on the peripheral wall surface of end cover 2 or the casing pipe 1. The overhead part is elastically arranged on the top inside the accommodating part.

In the first embodiment, the overhead part is a bulge 51 while the accommodating part is a groove 52. Wherein, the locations of the bulge 51 and the groove 52 can be exchanged. That is, the bulge 51 is defined on the end cover 2 and the groove 52 is correspondingly defined on the open end of the casing pipe 1. During the opening and the closing of the end cover 2, the bulge 51 must be deformed to a certain extent in order to be shifted from the groove 52. Therefore, the bulge 51 is required to be elastic. And in order to open the end cover 2 easily, the bulge 51 axially extends along a direction away from the open end of the casing pipe 1 in such a way that a gradient thereof gradually decreases.

The bulge 51 can be replaced by an elastic piece. At this time, a tapered groove is defined between an inner wall and an outer wall of the casing pipe 1. Two ends of the elastic piece are movably mounted inside the tapered groove. When the end cover 2 is closed, an upward force is generated at two ends of the elastic piece because the elastic piece is bent in the middle. Therefore, the middle bent part of the elastic piece stretches out of the tapered groove and heads into the groove 52, and the casing pipe is thereby closed. During the opening process of the end cover, a force is applied to the end cover and a downward force is thereby generated to be pressed on the elastic piece. Thus the middle bent part of the elastic piece is almost pressed into the tapered groove, and the casing pipe 1 is opened as a result.

A circular groove 20 is defined in the middle of an end of the end cover 2, and the end faces the casing pipe 1. A radius of the circular groove 20 is equal to an inner diameter of the casing pipe 1. A hollow circular truncated cone 21 used for abutting against the battery is defined on a bottom of the circular groove 20 and axially extends along a direction towards the casing pipe 1. Wherein, a contact piece 22 used for abutting against the battery is built into a recess where the circular truncated cone 21 is contacted with the battery.

The contact piece 22 is a conductive metal sheet. A wire (not shown) used for electrically connected to the atomizing unit is fixedly connected to an end face of the contact piece 22 away from the battery. A through hole (not shown) is defined on a sidewall of the circular truncated cone 21 to draw forth the wire from the round table 21. After being drawn forth via the through hole, the wire is axially drawn forth away from the end cover 2 via the space between the battery and casing pipe 1.

Figure 4:
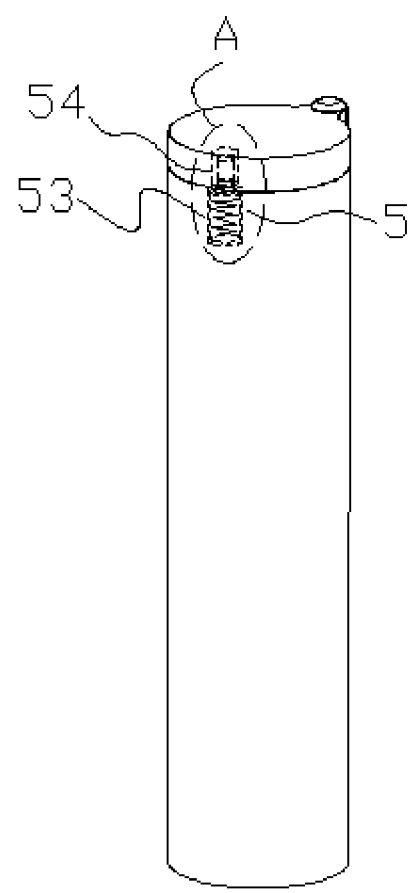
FIG. 4 is a structural schematic view of a closed battery component, according to a second embodiment of the present application.
Figure 5:
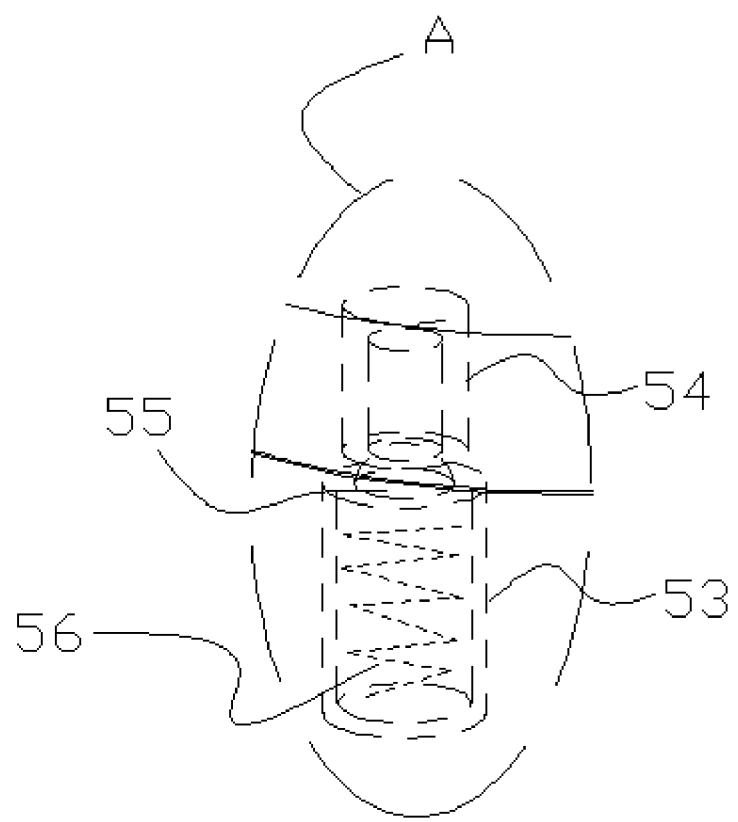
FIG. 5 is an enlarged view of the area A in FIG. 4.

Embodiment 2:

Referring to FIGS. 4 and 5, FIG. 4 is a structural schematic view of a closed battery component according to a second embodiment of the present application, and FIG. 5 is an enlarged view of the area A in FIG. 4.

The difference between the second embodiment and the first and second embodiments is that the overhead part is the telescopic rod 55. A first mounting hole 53 is defined between an inner wall and an outer wall of the casing pipe 1, and is further defined axially along the open end of the casing pipe 1. The telescopic rod 55 is movably connected to an inside of the first mounting hole 53. An elastic member 56 is fixed between the telescopic rod 55 and a bottom of the first mounting hole 53. The accommodating part is a second mounting hole 54 defined on the end cover 2 and right opposite the first mounting hole 53.

When the end cover 2 and the casing pipe 1 are closed, the telescopic rod 55 is inserted into the second mounting hole 54 under an elastic force of the elastic member 56; while during the opening process of the end cover 2 and the casing pipe 1, the telescopic rod 55 is pressed into the first mounting hole 53.

Figure 6:
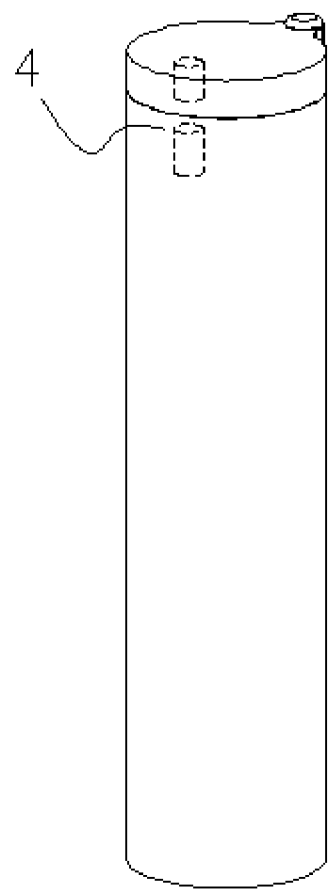
FIG. 6 is a structural schematic view of a closed battery component, according to a third embodiment of the present application.

Embodiment 3:

FIG. 6 is a structural schematic view of a closed battery component, according to a third embodiment of the present application.

The difference between the third embodiment and the first and second embodiments is that the elastic snap-fit connection structure is not used, but a magnetic connection structure 4 is arranged on the end face of the casing pipe 1 and the end face is contacted with the end cover 2.

In the third embodiment, a first mounting hole is defined on the casing pipe 1 and a second mounting hole is defined on the end cover 2, which is the same as in the second embodiment. Two magnets which are attracted by each other are respectively arranged on the first mounting hole and the second mounting hole.

Figure 7:
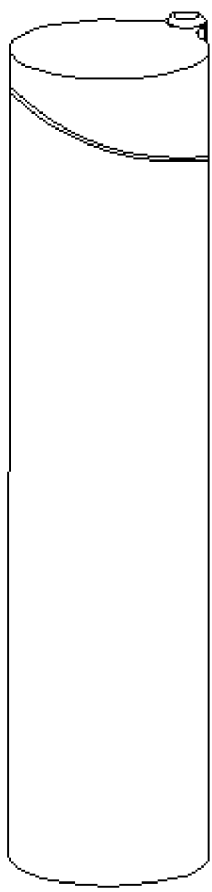
FIG. 7 is a structural schematic view of a closed battery component, according to a fourth embodiment of the present application.

Embodiment 4:

Now referring to FIG. 7, FIG. 7 is a structural schematic view of a closed battery component, according to a fourth embodiment of the present application.

In the above three embodiments, the contact surface between the end cover and the casing pipe is level. In the present application, it is possible for the contact surface between the end cover and the casing pipe to be curved or oblique. The difference between the fourth embodiment and the above three embodiments is that the contact surface between the end cover and the casing pipe is curved. By using a curved surface, when the magnetic connection structure or the elastic snap-fit connection structure fails, the curved surface is harder to be opened naturally than the level surface. The connection structure arranged on another side opposite to the rotation mechanism can be any connection structure of the above-mentioned three embodiments, and a magnetic connection structure is preferred in this embodiment.

An electronic cigarette is also provided, which comprises an atomizing unit and the above-mentioned battery component. Wherein, the atomizing unit is detachably connected to the battery component or the atomizing unit and the battery component are an integrally formed structure by sharing one outer casing pipe. One end of the above-mentioned battery component away from the end cover is electrically connected to the atomizing unit to power the atomizing unit.

In summary, by using the rotation mechanism which connects the battery component to the electronic cigarette, the end cover can be directly rotated to open the casing pipe; an operation is simple. In addition, the center axis of the rotation mechanism is parallel to the central axis line of the casing pipe, and the end cover rotates about the center axis of the rotation mechanism so as to open or close the casing pipe; in this way, even when a connection structure on one side of the end cover facing the rotation mechanism fails, the end cover is not naturally opened because the radial space is very compact, overcoming a defect that reserved space exists in an axial direction of the electronic cigarette which makes the end cover partially open and results in an existent of power leakage hidden danger exists, when a fastening structure in an end cover flipping technology fails.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. A battery component, comprises a casing pipe (1) used for accommodating a battery and an end cover (2) that is arranged on and covers an open end of the casing pipe (1);
   wherein the battery component further comprises a rotation mechanism (3) used for connecting the casing pipe (1) to the end cover (2); a center axis of the rotation mechanism (3) is parallel to a central axis line of the casing pipe (1); and
   the end cover (2) rotates about the center axis of the rotation mechanism (3) so as to open or close the casing pipe (1); and
   wherein the rotation mechanism (3) comprises a first connection portion and a second connection portion; and
   the first connection portion is connected to the second connection portion via a rotation shaft or a pin shaft.

2. An electronic cigarette, comprising an atomizing unit and a battery component, wherein the battery component comprises a casing pipe (1) used for accommodating a battery and an end cover (2) that is arranged on and covers an open end of the casing pipe (1);
   wherein the battery component further comprises a rotation mechanism (3) used for connecting the casing pipe (1) to the end cover (2); a center axis of the rotation mechanism (3) is parallel to a central axis line of the casing pipe (1); and
   the end cover (2) rotates about the center axis of the rotation mechanism (3) so as to open or close the casing pipe (1); and
   wherein the rotation mechanism (3) comprises a first connection portion and a second connection portion, and the first connection portion is connected to the second connection portion via a rotation shaft or a pin shaft.

3. The battery component according to claim 1, wherein the first connection portion is connected to the second connection portion via the rotation shaft; the first connection portion is a first flange; wherein the first flange is defined on a side edge of the open end of the casing pipe (1) and further radially extends along a direction away from a central axis of the casing pipe (1);
   the second connection portion is a second flange (32); the second flange (32) is defined on a side edge of the end cover (2) and further extends along the same direction with the first flange;
   a first through hole is defined on the first flange; a second through hole (321) is defined on the second flange (32); the rotation shaft successively passes through space respectively formed by the first through hole and the second through hole (321); and
   limiting covers (33) are arranged on both ends of the rotation shaft, and are used for limiting an axial displacement of the end cover (2).

4. The battery component according to claim 1, wherein, a magnetic connection structure (4) is arranged on an end face of the casing pipe (1), and the end face is contacted with the end cover (2).

5. The battery component according to claim 1, wherein an elastic snap-fit connection structure (5) is arranged on another side opposite to the rotation mechanism (3), and the elastic snap-fit connection structure (5) is used to form an elastic snap-fit connection between the end cover (2) and the casing pipe (1).

6. The battery component according to claim 5, wherein the elastic snap-fit connection structure (5) comprises at least one overhead part and at least one accommodating part matching with the overhead part; wherein the overhead part is defined on a peripheral wall surface of the casing pipe (1) or the end cover (2);
   the accommodating part is defined on the peripheral wall surface of end cover (2) or the casing pipe (1); and the overhead part is elastically arranged on the top inside the accommodating part.

7. The battery component according to claim 6, wherein the overhead part is a bulge (51); the bulge (51) axially extends along a direction away from the open end of the casing pipe (1) in such a way that a gradient thereof gradually decreases; the accommodating part is a groove (52).

8. The battery component according to claim 6, wherein the overhead part is an elastic piece; and two ends of the elastic piece are movably mounted inside a tapered groove defined between an inner wall and an outer wall of the casing pipe (1).

9. The battery component according to claim 6, wherein a first mounting hole (53) is defined between an inner wall and an outer wall of the casing pipe (1), and is further defined axially along the open end of the casing pipe (1); the overhead part is a telescopic rod (55) movably connected to an inside of the first mounting hole (53);

an elastic member (56) is fixed between the telescopic rod (55) and a bottom of the first mounting hole (53);

the accommodating part is a second mounting hole (54) defined on the end cover (2) and right opposite the first mounting hole (53);

when the end cover (2) and the casing pipe (1) are closed, the telescopic rod (55) is inserted into the second mounting hole (54) under an elastic force of the elastic member (56); while during the opening process of the end cover (2) and the casing pipe (1), the telescopic rod (55) is pressed into the first mounting hole (53).

10. The battery component according to claim 1, wherein a circular groove (20) is defined in the middle of an end of the end cover (2), and the end faces the casing pipe (1);

a radius of the circular groove (20) is equal to an inner diameter of the casing pipe (1); and a circular truncated cone (21) used for abutting against the battery is defined on a bottom of the circular groove (20) and axially extends along a direction towards the casing pipe (1).

11. The battery component according to claim 10, wherein a contact piece (22) used for abutting against the battery is arranged on an area where the circular truncated cone (21) is contacted with the battery.

12. The electronic cigarette according to claim 2, wherein an elastic snap-fit connection structure (5) is arranged on another side opposite to the rotation mechanism (3), and the elastic snap-fit connection structure (5) is used to form an elastic snap-fit connection between the end cover (2) and the casing pipe (1).

13. The electronic cigarette according to claim 2, wherein the atomizing unit and the battery component are an integrally formed structure or a detachably connected structure.

14. The electronic cigarette according to claim 2, wherein the first connection portion is connected to the second connection portion via the rotation shaft; the first connection portion is a first flange; wherein the first flange is defined on a side edge of the open end of the casing pipe (1) and further radially extends along a direction away from a central axis of the casing pipe (1);

the second connection portion is a second flange (32); the second flange (32) is defined on a side edge of the end cover (2) and further extends along the same direction with the first flange;

a first through hole is defined on the first flange; a second through hole (321) is defined on the second flange (32); the rotation shaft successively passes through space respectively formed by the first through hole and the second through hole (321); and limiting covers (33) are arranged on both ends of the rotation shaft, and are used for limiting an axial displacement of the end cover (2).

15. The electronic cigarette according to claim 2, wherein a magnetic connection structure (4) is arranged on an end face of the casing pipe (1), and the end face is contacted with the end cover (2).

16. The electronic cigarette according to claim 12, wherein the elastic snap-fit connection structure (5) comprises at least one overhead part and at least one accommodating part matching with the overhead part; wherein the overhead part is defined on a peripheral wall surface of the casing pipe (1) or the end cover (2);

wherein the accommodating part is defined on the peripheral wall surface of end cover (2) or the casing pipe (1); and the overhead part is elastically arranged on the top inside the accommodating part.

17. The electronic cigarette according to claim 16, wherein a first mounting hole (53) is defined between an inner wall and an outer wall of the casing pipe (1), and is further defined axially along the open end of the casing pipe (1);

the overhead part is a telescopic rod (55) movably connected to an inside of the first mounting hole (53); an elastic member (56) is fixed between the telescopic rod (55) and a bottom of the first mounting hole (53); the accommodating part is a second mounting hole (54) defined on the end cover (2) and right opposite the first mounting hole;

when the end cover (2) and the casing pipe (1) are closed, the telescopic rod (55) is inserted into the second mounting hole (54) under an elastic force of the elastic member (56); while during the opening process of the end cover (2) and the casing pipe (1), the telescopic rod (55) is pressed into the first mounting hole (53).

18. The electronic cigarette according to claim 16, wherein the overhead part is a bulge (51); the bulge (51) axially extends along a direction away from the open end of the casing pipe (1) in such a way that a gradient thereof gradually decreases; the accommodating part is a groove (52).

* * * * *